United States Patent
Dean

(10) Patent No.: US 11,603,783 B2
(45) Date of Patent: Mar. 14, 2023

(54) MUFFLER FILTER

(71) Applicant: Christopher A. Dean, Palm Coast, FL (US)

(72) Inventor: Christopher A. Dean, Palm Coast, FL (US)

(*) Notice: Subject to any disclaimer, the term of this patent is extended or adjusted under 35 U.S.C. 154(b) by 0 days.

(21) Appl. No.: 17/156,131

(22) Filed: Jan. 22, 2021

(65) Prior Publication Data

US 2021/0140356 A1 May 13, 2021

Related U.S. Application Data

(63) Continuation of application No. 16/297,588, filed on Mar. 9, 2019, now Pat. No. 10,900,398.

(60) Provisional application No. 62/671,475, filed on May 15, 2018.

(51) Int. Cl.
| | |
|---|---|
| *F01N 13/18* | (2010.01) |
| *F01N 3/08* | (2006.01) |
| *F01N 13/00* | (2010.01) |

(52) U.S. Cl.
CPC ......... *F01N 3/0821* (2013.01); *F01N 3/0857* (2013.01); *F01N 13/009* (2014.06); *F01N 13/18* (2013.01); *F01N 13/1805* (2013.01)

(58) Field of Classification Search
CPC .... F01N 3/0821; F01N 3/0857; F01N 13/009; F01N 13/18; F01N 13/1805; F01N 2450/18; F01N 13/082; F01N 3/021; F01N 2450/10; F01N 2450/30; Y02T 10/12
See application file for complete search history.

(56) References Cited

U.S. PATENT DOCUMENTS

| | | | | |
|---|---|---|---|---|
| 4,592,823 A | * | 6/1986 | Gregory | G01N 27/38 324/438 |
| 9,869,282 B2 | * | 1/2018 | Yamamoto | F02M 25/0854 |
| 2003/0226412 A1 | * | 12/2003 | Rumminger | F01N 13/1822 73/866.5 |
| 2011/0023452 A1 | * | 2/2011 | Gisslen | F01N 13/1844 60/272 |
| 2012/0017574 A1 | * | 1/2012 | Hasan | F01N 13/1805 60/297 |

* cited by examiner

*Primary Examiner* — Michael C Zarroli

(74) *Attorney, Agent, or Firm* — The Concept Law Group, PA; Scott M. Garrett; Scott D. Smiley

(57) ABSTRACT

A muffler filter includes a housing including an aperture, a cartridge holder, at least one activated filter, an attachable lock associated with the activated filter, and a plurality of clamps. The muffler filter is configured to be securely affixed to a muffler of a vehicle allowing the activated filter to sieve noxious fumes from emissions from the muffler.

19 Claims, 4 Drawing Sheets

MUFFLER FILTER

CROSS-REFERENCE TO RELATED APPLICATION

This application is a continuation of U.S. patent application Ser. No. 16/297,588 filed Mar. 9, 2019, which claims the benefit of U.S. Provisional Patent Application No. 62/671,475 filed May 15, 2018, each of which is incorporated by reference herein in its entirety.

FIELD OF THE DISCLOSURE

The present invention relates generally to muffler devices for vehicles, and more specifically a muffler filter to alleviate carbon emissions and toxic fumes from entering the environment.

BACKGROUND OF THE DISCLOSURE

Air pollution is currently a huge problem in society. The World Health Organization estimates that about 7 million people worldwide are killed each year due to air pollution. Air pollution occurs when harmful or excessive quantities of substances including gases, particles, and biological molecules are introduced into the Earth's atmosphere. It is apparent that air pollution increased exponentially due to the introduction of motor vehicles into everyday life. Motor vehicles such as cars, trucks, busses, motorcycles, and other applicable vehicles powered by fossil fuels are major contributors to air pollution and also a major source of global warming emissions.

The large majority of current vehicles travel by utilizing internal combustion engines that exacerbate the aforementioned issue by releasing emissions from tailpipes. These emissions produce photochemical air pollution affecting the environment overall. Therefore, there exists a need for a muffler filter that reduces or eliminates emissions from vehicles in order to diminish air pollution.

SUMMARY OF THE DISCLOSURE

The invention provides a filter including a housing that includes a first end with an aperture, a cartridge holder including an anterior side, at least one activated filter configured to interact with a transport system, an attachable lock configured to be affixed to the housing, a plurality of clamps configured to be affixed to the housing. The filter is replaceable and configure to be affixed to a muffler of a vehicle.

One general aspect includes a method for utilizing a filter. The method including affixing a housing to a bumper assembly comprising a top end and a bottom end adjacent to an exhaust of a vehicle; attaching at least one activated filter to a cartridge holder configured to be embedded in the first end via the aperture, wherein the at least one activated filter is configured to interact with a transporter system; locking the housing to the bumper assembly via attaching a band mechanism and a filter interlock over the housing; and generating, via the at least one activated filter and transport system, a matrix of absorbent material configured to absorb a plurality of noxious fumes.

Although the invention is illustrated and described herein as embodied in a system and methods for managing and monitoring employee identity and productivity, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

"In the description of the embodiments of the present invention, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes, and cannot be construed as indicating or implying relative importance.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system. Those skilled in the art can understand the specific meanings of the above-mentioned terms in the embodiments of the present invention according to the specific circumstances.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
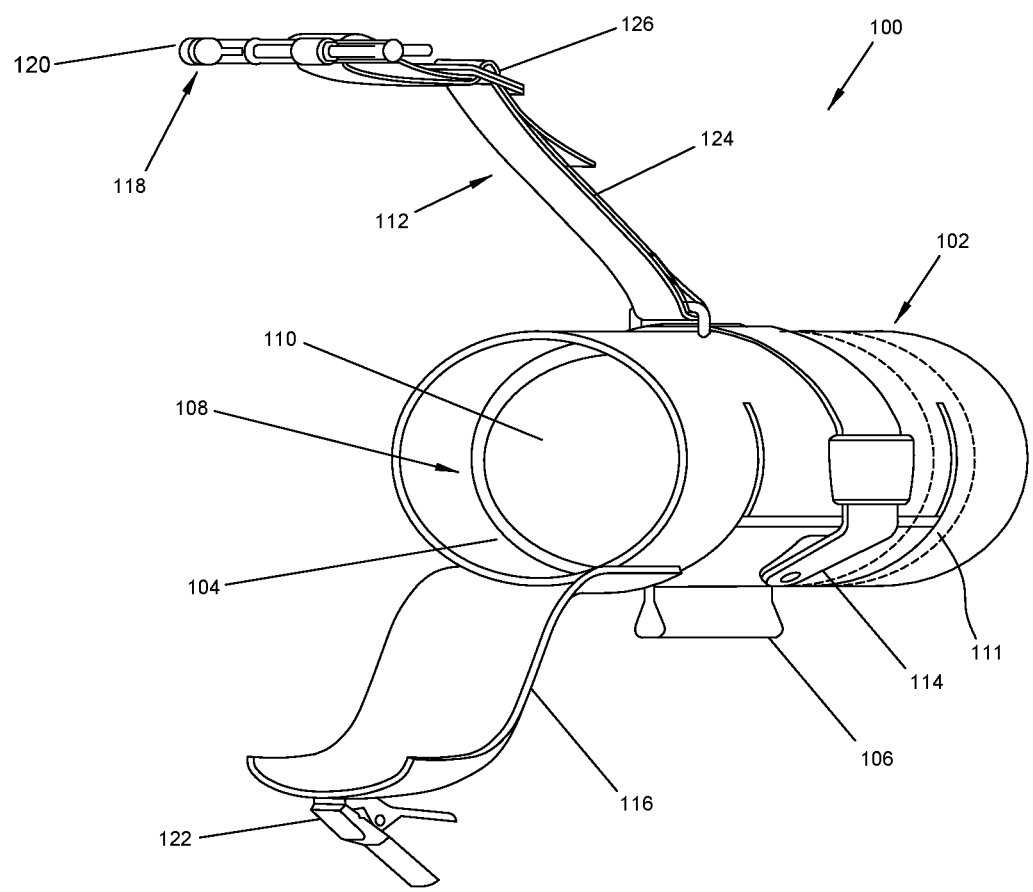
FIG. 1 is a perspective view of a muffler filter, according to a first example embodiment.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient filter and method for a filter designed and configured for the muffler of a vehicle. Embodiments of the invention provide a filter including a housing, a cartridge holder, at least one activated filter, an attachable lock, and a plurality of clamps wherein the aforementioned cooperate to be affixed to a muffler of a vehicle in order to generate a matrix of absorbent material configured to absorb a plurality of noxious fumes emitted from an exhaust of the vehicle, wherein the at least one activated filter is configured interact with an ionic transport membrane system resulting in the absorbing and/or filtration of the plurality of noxious fumes. Embodiments of the invention further provide a movable slide, a band mechanism, and a filter interlock each of which are configured to be affixed to the housing allowing the filter to be securely attached to the bumper of the vehicle, wherein the band mechanism is configured to be fireproof. Embodiments of the invention further provide a strap mechanism including a strap lock mechanism configured to support the plurality of clamps in serving as a reinforcement of the attachment to the bumper of the vehicle, wherein the strap mechanism is adjustable. The filter and method described herein provides improvements to the environment by eliminating and/or significantly reducing the amount of noxious fumes emitted from a vehicle into the atmosphere by filtering toxic particles and preventing them from being emitted; thus, the invention herein enhances the quality of the environment.

Referring now to the FIG. 1, an illustration of a muffler filter (hereinafter referred to as "filter") 100 is depicted, according to a first exemplary embodiment. In one embodiment, filter 100 includes a housing 102 including at least one aperture 104, a cartridge holder 106 including an anterior side 108 designed and configured to house at least one activated filter 110. It is to be understood that filter 100 is designed and configured to be securely attached to a muffler, duct, silencer, or any other component of a vehicle configured to release emissions. It is to be further understood that as described herein a vehicle may be any article configured to emit emissions; thus, filter 100 is configured to be designed in various shapes and sizes based on the dimensions of the emissions source, and affixed directly or substantially proximate to the emission source in order for filter 100 to actively sieve the emissions. Filter 100, along with its components, is configured to be attachable and replaceable, and components of filter 100 may be composed of carbon steel, stainless steel, aluminum, titanium, composites, ceramics, polymeric materials such as polycarbonates, such as acrylonitrile butadiene styrene (ABS plastic), Lexan™, Makrolon™, or any other applicable material. It is to be understood that filter 100 and all of its components may be manufactured from a variety of different processes including an extrusion process, a mold, welding, shearing, punching welding, folding etc. In a preferred embodiment, filter 100 is composed of incombustible metal.

In one embodiment, anterior side 108 includes a circular-like mechanism configured to allow housing 102 to serve as a portal for a plurality of noxious fumes to enter filter 100, via aperture 104, when filter 100 is affixed to a muffler, wherein activated filter 110 and/or a plurality of activated filter 110 is housed in aperture 104. In some embodiments, activated filter 110 is composed of activated charcoal, carbon, or any other applicable material configured to remove volatile organic compounds (VOCs), odors, particles, and other gaseous pollutants from emissions. It is to be understood that activated filter 110 is configured to be combined with one or more transport systems 111 in addition to other additional filters in order to generate and/or support a plurality of absorbent material embodied in a matrix configured to absorb and/or filter the plurality of noxious fumes emitted from the emissions source that filter 100 is affixed and/or substantially proximate to. In one embodiment, the transport system 111 is an ionic transport membrane system configured to support absorbing and/or filtering of emissions. It is to be understood that attachment of filter 100 to and/or proximate to the emissions source may be accomplished by any clip, clasp, fastener, hook, coupler, or any applicable form of attachment (or combination thereof) known to those of ordinary skill in the art that allows filter 100 to be position on and/or proximate to the emissions source.

In one embodiment, filter 100 further includes a band mechanism 112, a filter interlock 114, a movable slide 116, a plurality of clamps 118 including a first clamp 120 and a second clamp 122, and a strap mechanism 124 including a strap lock 126. In one embodiment, band mechanism 112 and filter interlock 114 are configured to be affixed to housing 102 in order to lock filter 100 to the muffler wherein band mechanism 112 serves as the connecting mechanism between housing 102 and first clamp 120, and movable slide 116 is proximate to second clamp 122 and also configured to be affixed to housing 102 in order to lock filter 100 to the muffler; however, in some embodiments, movable slide 116 is affixed proximate to a bumper associated with the vehicle donning filter 100 while band mechanism 112 is allocated at the top of housing 102. For example, while movable slide 116 is securely affixed to the bottom of the bumper, band mechanism 112 is configured to affix filter 100 to the top of the bumper, wherein attachment is accomplished via first clamp 120 and second clamp 122, respectively. In one embodiment, band mechanism 112 is composed of a fire-resistant/fireproof material configured to endure abnormally high temperatures. Movable slide 116 is allocated along a bottom portion of filter 100 and configured to be adjustable based on size, dimension, and position of the muffler, wherein movable slide 116 cooperates with second clamp 122 to affix filter 100 to the bottom of the bumper. Strap mechanism 124 is configured to be affixed to housing 102, wherein strap mechanism 124 is adjustable based upon desired length of strap mechanism 124 relative to strap lock 126, wherein strap lock 126 retains the desired length of strap mechanism 124. In some embodiments, strap mechanism 124 is allocated along a top portion of filter 100 proximate to first clamp 120 allowing strap mechanism 124 to extend from the top portion of filter 100 (in particular, the top portion of housing 102) to first clamp 120, wherein first clamp 120 is configured to be affixed to the top of the bumper. In some embodiments, strap mechanism 124 is configured to serve the same purpose as band mechanism 112 and may be interchangeable with band mechanism 112 wherein strap mechanism 124 may be fireproof. Plurality of clamps 118 may be sourced from an interior surface (within or near aperture 104) or an exterior surface of housing 102.

In one embodiment, filter interlock 114 may be a plurality of filter interlock 114 in which a first filter interlock may be allocated on the top of housing 102 and a second filter interlock may be allocated on the bottom of housing 102, wherein filter interlock 114 is configured to assist band mechanism 112 in locking cartridge holder 106 in place and replacement of filter 100 is achieved by unlocking filter interlock 114 from band mechanism 112. In one embodiment, filter interlock 114 may serve as an attachable locking mechanism configured to be affixed to housing 102 and lock activated filter 110 in position by interacting with cartridge holder 106. Although the example embodiments provided herein refer to top and bottom portions of housing 102, it is within the spirit and scope of the invention to include left and right, diagonal, parallel, or perpendicular configurations wherein components of filter 100 configured to include a plurality (i.e., filter interlock 114, clamps 118, etc.) may be disposed in opposing positions in order to support dual sided affixing of filter 100 to the muffler.

Figure 2A:
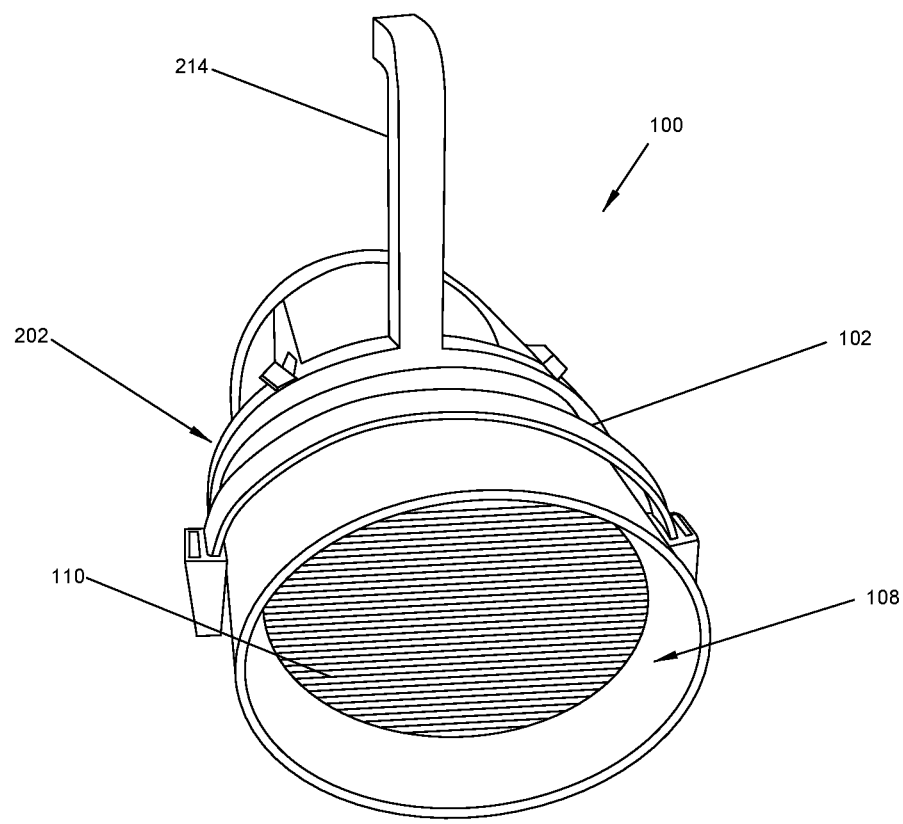
FIG. 2A is a front view of the muffler filter, according to a second example embodiment.
Figure 2B:
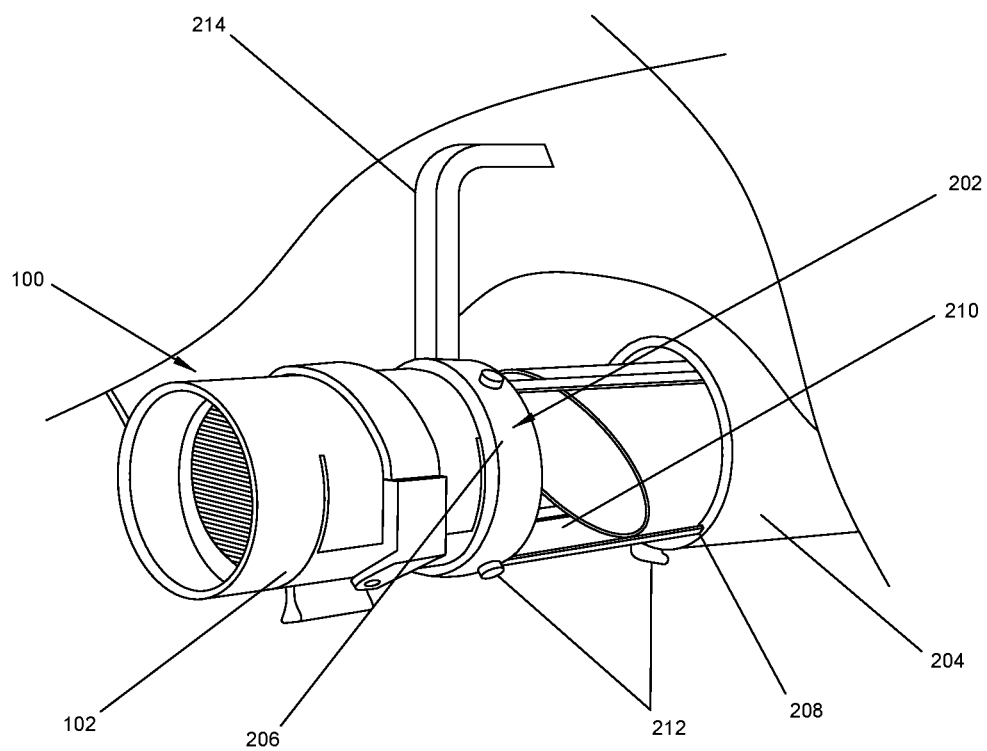
FIG. 2B is a perspective view of the muffler filter of FIG. 2A affixed to a muffler of a vehicle, according to an example embodiment.

Referring now to the FIGS. 2A-2B, an illustration of filter 100 is depicted, according to a second exemplary embodiment. In one embodiment, filter 100 includes a connecting housing 202 configured to securely affix housing 102 to a muffler/exhaust 204 of a vehicle. Connecting housing 202 may include a first end 206 and a second end 208, wherein first end 206 is configured to be proximate to housing 102 and second end 208 is configured to be proximate to muffler 204. In one embodiment, first end 206 and second end 208 are opposing and designed to cooperate thereby defining an at least partially enclosed space 210 configured to direct emissions from muffler 204 to housing 102. In one embodiment, connecting housing 202 further includes at least an attachment mechanism 212 allocation along one or more surfaces of at least one of first end 206 and/or second end 208. It is to be understood that attachment mechanism 212 is intended to allow connecting housing 202 to securely retain possession of housing 102 and muffler 204, wherein attachment mechanism 212 may be a fastener configuration including but not limited to screws, nails, pegs, dowels, clamps, bolts, rivets, or any other means of attachment designed to be integrated and/or interlaced on at least a surface of housing 102 and connecting housing 202. Due to the varying size and circumference of mufflers/exhausts, in some embodiments, attachment mechanism 212 is configured to be adjustable at least when allocated on second end 208 to ensure tight retention to muffler 204. For example, second end 208 may support a hand-screw clamp configuration to ensure secure retention to muffler 204. It is to be understood that the aforementioned supports connecting housing 202 being detachable or permanently affixed to housing 102 allowing filter 100 to be unitarily joined to muffler 204. It is to be further understood that in some embodiments connecting housing 202 may be utilized to support components used for affixing filter 100 to a surface of the vehicle such as plurality of clamps 118; however, in some embodiments connecting housing 202 includes a support arm mechanism 214 configured to come into proximal contact with at least a surface of the vehicle in order to support retention of connecting housing 202 to muffler 204.

Figure 3:
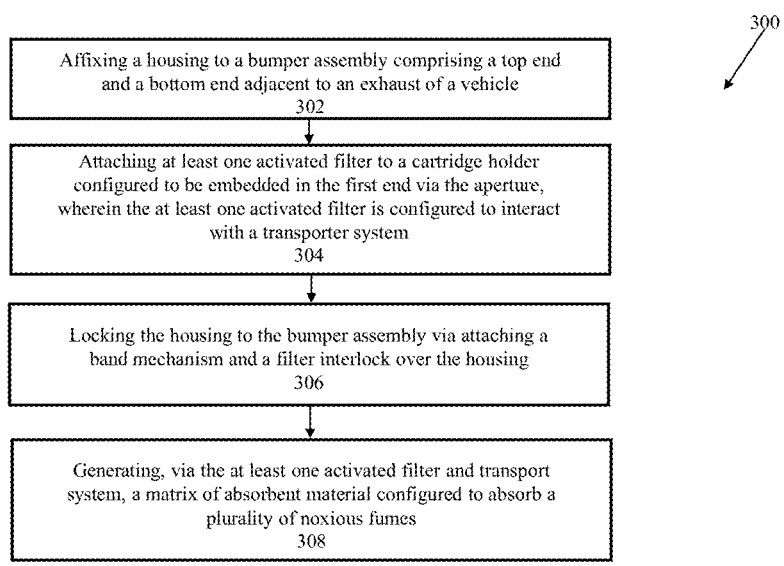
FIG. 3 is a block diagram illustrating an exemplary method for utilizing the muffler filter, according to an example embodiment.

Referring now to FIG. 3, a method 300 for applying filter 100 to a bumper assembly is depicted, according to an exemplary embodiment. At step 302, filter 100 is affixed to the muffler via attaching first clamp 120 to the top of the bumper and second clamp 122 to the bottom of the bumper, wherein strap mechanism 124 remains in a locked position via strap lock 126 eliminating any slack between first clamp 120 and housing 102. In one embodiment, placement of second clamp 122 may be adjusted via moveable slide 116 allowing second clamp 122 to affixed to the bottom of the bumper in a position opposing first clamp 120. At step 304, activated filter 110 is embedded within aperture 104; however, it is to be understood that filter 100 may come manufactured with activated filter 110 embedded within aperture 104, wherein activated filter 110 is configured to be replaceable. Activated filter 110 is configured to be replaced every three months or subject to the condition of activated filter 110. At step 306, housing 102 is in locked engagement to the bumper via band mechanism 112 and/or strap mechanism 124 being utilized to affix first clamp 120 to the top portion of the bumper and movable slide 116 being utilized to affix second clamp 122 to the bottom portion of the bumper; thus, filter 100 is properly and securely positioned to receive the plurality of noxious fumes being emitted through the muffler. At step 308, the combination of activated filter 110 and the ionic transport membrane system generate a matrix of absorbent material configured to absorb the plurality of noxious fumes. It is to be understood that the plurality of noxious fumes are funneled towards activated filter 110 via aperture 104 allowing activated filter 110 to eliminate toxicity within the emissions from the vehicle.

The claims appended hereto are meant to cover all modifications and changes within the scope and spirit of the present invention.

What is claimed is:
1. A filter comprising:
a housing comprising a first end with an aperture;
a cartridge holder comprising an anterior side;

at least one activated filter-configured to interact with a transport system;

an attachable lock configured to be affixed to the housing; and a plurality of clamps configured to be affixed to the housing, wherein a first clamp of the plurality of clamps is configured to be affixed to a strap mechanism and a second clamp of the plurality of clamps is configured to be affixed to a moveable slide mechanism.

2. The filter of claim 1, wherein the filter is configured to be affixed to a muffler of a vehicle.

3. The filter of claim 1, wherein the cartridge holder is removable and configured to be embedded in the aperture.

4. The filter of claim 1, wherein the cartridge holder comprises a circular-like mechanism allocated on the anterior side.

5. The filter of claim 1, wherein the at least one activated filter is a charcoal filter, and wherein the charcoal filter interacts with the transport system inside the removable cartridge holder supporting removal of toxic pollutants from emitted toxic fumes.

6. The filter of claim 1, further comprising a movable slide mechanism configured to be affixed at the bottom of the housing, wherein the moveable slide mechanism is configured to be proximate to a bumper of a vehicle.

7. The filter of claim 1, further comprising a band mechanism and a filter interlock configured to be attached to the housing in order to lock the filter to a muffler of a vehicle.

8. The filter of claim 7, wherein the band mechanism is fire resistant.

9. The filter of claim 1, further comprising a strap mechanism and a strap lock mechanism, wherein the strap mechanism is adjustable and the strap lock mechanism is disposed on the strap mechanism.

10. The filter of claim 1, wherein the transport system is an ionic transport membrane system.

11. The filter of claim 1, wherein the transport system and the at least one activated filter interact to generate a matrix of absorbent material configured to absorb a plurality of noxious fumes emitted from an exhaust of a vehicle.

12. A method for filtering exhaust, comprising:

affixing a housing to a bumper assembly comprising a top end and a bottom end adjacent to an exhaust of a vehicle;

wherein the housing comprises a first end with an aperture;

attaching at least one activated filter to a cartridge holder configured to be embedded in the first end through the aperture, wherein the at least one activated filter is configured to interact with a transport system;

locking the housing to the bumper assembly via attaching a band mechanism and a filter interlock over the housing;

filtering, via the at least one activated filter and the transport system, a matrix configured to absorb a plurality of noxious fumes emitted from the exhaust.

13. The method of claim 12, wherein affixing the housing to the bumper assembly comprises:

attaching the housing to the bumper assembly via a strap mechanism and a strap lock;

wherein a bottom portion of the housing is in locked engagement with the bottom end via at least a movable slide, and the filter interlock cooperates with the band mechanism in order to support locking of the cartridge holder.

14. The method of claim 12, wherein the band mechanism is fire resistant.

15. The method of claim 12, wherein affixing the housing to the bumper assembly comprises:

attaching a bottom portion of the housing to the bottom end via a first clamping structure; and attaching a top portion of the housing to the top end via a second clamping structure.

16. The method of claim 12, wherein the at least one activated filter is a charcoal filter.

17. The method of claim 12, wherein the cartridge holder comprises a circular-like mechanism configured to function as an anterior side providing access to the aperture.

18. The method of claim 12, wherein the transport system is an ionic transport membrane system.

19. A muffler filter comprising:

a base housing comprising an aperture;

a connecting housing comprising a first end and a second end, wherein the first end and the second end cooperate to define an at least partially enclosed space and the first end is attachable to the base housing;

at least one attachment mechanism configured to affix the first end to the base housing allowing a portion of the aperture to be proximate to the at least partially enclosed space, wherein the second end is configured to be affixed to a muffler of a vehicle;

at least one activated filter housed in the aperture configured to interact with a transport system to filter noxious fumes from emissions of the muffler; and a support arm mechanism configured to be in contact with at least a surface of the vehicle for retaining the muffler filter to the muffler.

* * * * *